(12) United States Patent
Chen et al.

(10) Patent No.: US 12,556,135 B2
(45) Date of Patent: Feb. 17, 2026

(54) SELF-CLEANING FOLDABLE SOLAR PANEL SYSTEM

(71) Applicant: A&C Future Inc, Newport Beach, CA (US)

(72) Inventors: Shoue Chen, Irvine, CA (US); Jiuqi Wang, Santa Ana, CA (US); Zhuangboyu Zhou, Santa Ana, CA (US); Sichen Li, Santa Ana, CA (US); Ju Gao, Newport Beach, CA (US); Han Qin, Newport Beach, CA (US); Jiayang Qin, Newport Beach, CA (US)

(73) Assignee: A&C FUTURE INC

( * ) Notice: Subject to any disclaimer, the term of this patent is extended or adjusted under 35 U.S.C. 154(b) by 217 days.

(21) Appl. No.: 18/116,370

(22) Filed: Mar. 2, 2023

(65) Prior Publication Data
US 2024/0297616 A1    Sep. 5, 2024

(51) Int. Cl.
| | |
|---|---|
| *H02S 40/10* | (2014.01) |
| *H02S 30/20* | (2014.01) |
| *H02S 20/30* | (2014.01) |

(52) U.S. Cl.
CPC ............ *H02S 40/10* (2014.12); *H02S 30/20* (2014.12); *H02S 20/30* (2014.12)

(58) Field of Classification Search
None
See application file for complete search history.

(56) References Cited

FOREIGN PATENT DOCUMENTS

| | | | |
|---|---|---|---|
| CN | 111911608 A | * | 11/2020 |
| CN | 114465566 A | * | 5/2022 |
| DE | 102016110913 A1 | * | 12/2017 |
| WO | WO-2020260349 A1 | * | 12/2020 ............. H02S 10/40 |

* cited by examiner

*Primary Examiner* — Dustin Q Dam
(74) *Attorney, Agent, or Firm* — Elizabeth Yang

(57) ABSTRACT

A self-cleaning foldable solar panel system with a foldable support system and a self-cleaning unit is provided. The foldable support system is composed of a main support board, a first support board, and a second support board. The solar panels of the array are mounted on support frames of the support boards by means of worm wheels. The folding support system allows the solar panels to save space when they are not in use. The support frame provides tilt angle adjustment for the solar panels. The worm wheels allow the solar panel to be adjusted to rotate horizontally. The reciprocating motion and rotation of the rotary brush that works when the system is in folded status make it possible to keep the system clean by brushing it automatically. Compared to traditional solar panels, the present self-cleaning foldable solar panel system is portable, angle-adjustable, and self-cleaning.

16 Claims, 8 Drawing Sheets

SELF-CLEANING FOLDABLE SOLAR PANEL SYSTEM

FIELD OF THE INVENTION

The present invention relates to a foldable solar panel system. More so, self-cleaning unit for the foldable solar panel system is introduced herein.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Installation of solar panels for residences and RVs has become more and more widespread these years, especially for the regions rich in sunlight. Whereas the cleanliness of solar panels becomes more arresting during daily operation as the accumulation of dust on the surface of a solar panel will seriously affect its efficiency of power generation. In detail, dust will stack and turn into a heat insulation layer on the panel over time, and the influenced heat dissipation of photovoltaic will hinder its conversion. Also, dust adhered will directly induce shading and would reflect, scatter, and absorb solar radiation, reducing the area for effective energy conversion. Compared with clean surfaces, solar panels covered with dust will lose 20~25% of their power outputs according to Solar Energy Power Association.

Hence, in order to make better use of the electricity generated by solar panels, it is better to clean the solar panels once or twice a month. However, climbing up on the roof of a dwelling or top of an RV requires specific safety precautions and definitely causes troubles for the resident and R Ver. Not to mention the cost of leaving this task to the professionals. As a result, a solar panel platform with self-cleaning functionality is of great importance.

On the other hand, the positioning and angling of solar panels will essentially determine the amount of energy harvested during the day. As is well known, the amount of electricity produced depends on the orientation of the solar panels relative to the sun and a solar panel can collect solar radiation more efficiently when the sunlight is perpendicular to the panels. As of the end of 2017, nearly 40% of utility-scale photovoltaic (PV) systems operating in the States were fixed-tilt systems rather than tracking ones. The fixed-tilt solar panel system is okay for traditional dwellings due to immovability although the best-tilted angle varies with the season and the time period during the day. While for RVs and mobile homes, their frequent movability will pose issues to the positioning and angling of solar panels for the resident and R Vers.

To solve the above problems, the present invention is proposed. In this invention, a foldable solar panel column system which can be transported and installed via a box-like configuration is developed with both positioning and angling, and self-cleaning functionalities.

SUMMARY

Illustrative embodiments of the disclosure are generally directed to a foldable solar panel system.

A self-cleaning foldable solar panel system may be provided. The self-cleaning foldable solar panel system may have a foldable support system and a self-cleaning unit.

The foldable support system may have a main support board, a first support board, and a second support board; a first edge of the main support board may be pivoted to an edge of the first support board; a second edge of the main support board may be pivoted to an edge of the second support board; a third edge of the main support board may be provided with a first guiding member; a fourth edge of the main support board may be provided with a second guiding member.

The self-cleaning unit may have at least a rotary brush and a first brush motor; one end of the rotary brush may be set on the first guiding member, another end of the rotary brush may be set on the second guiding member, the first brush motor may drive the rotary brush to move along the first guiding member and the second guiding member.

The main support board, the first support board, and the second support board may be each independently installed with multiple solar panels.

Each solar panel may be mounted on a support frame; the support frame may have a solar panel mounting bracket, a support base, and a solar panel drive motor; the solar panel may be mounted on the solar panel mounting bracket, one end of the solar panel mounting bracket may be hinged to the support base; solar panel drive motor may drive the solar panel mounting bracket to rotate relative to the support base. each support frame may be mounted on a worm wheel; each worm wheel may be rotatably mounted on the main support board, the first support board, or the second support board. The worm wheels may be arranged in columns.

Worm wheels on the same column may be driven by a worm.

The main support board may be provided with at least one column of worm wheel accommodating cavities; the main support board may be provided with at least one worm channel; a worm window for a worm to engage with the worm wheel may be provided on inner wall of each worm wheel accommodating cavity along the worm channel.

The first support board may be provided with at least one column of worm wheel accommodating cavities; the first support board may be provided with at least one worm channel; a worm window for a worm to engage with the worm wheel may be provided on inner wall of each worm wheel accommodating cavity along the worm channel.

The worm inside the worm channel may be a segmental worm with threads corresponding to the worm window.

The second support board may be provided with at least one column of worm wheel accommodating cavities; the second support board may be provided with at least one worm channel; a worm window for a worm to engage with the worm wheel may be provided on inner wall of each worm wheel accommodating cavity along the worm channel.

The worms may be controlled by a worm controller synchronously.

Each worm wheel may be provided with a notch on the top surface to embed the support frame.

Each worm wheel may be mounted on a deep groove ball bearing which can provide smoother rotation.

Each support base may have a pair of support rods, a pair of slides, a pair of screws, and a pair of sliders; the pair of screws may drive the pair of sliders to move forward and backward along the pair of slides; one pair ends of the support rods may be pivoted to the support base, another pair ends of the support rods may be pivoted to middle of the solar panel mounting bracket; one end of the solar panel mounting bracket may be hinged to the pair of sliders.

Each support frame may have a first screw belt, a second screw belt, a first screw pulley, a second screw pulley, and a first drive pulley and a second drive pulley coaxial to the shaft of the solar panel drive motor; the solar panel drive motor may drive the first drive pulley and the second drive pulley synchronously; the first drive pulley may drive the first screw belt to move, thereby driving the first screw pulley that cooperates with the first screw belt to rotate; the second drive pulley may drive the second screw belt to move, thereby driving the second screw pulley that cooperates with the second screw belt to rotate; the first screw pulley and the second screw pulley may drive the pair of screws to rotate.

The first guiding member further may have a first guiding rod, a first guiding fixture slides along the first guiding rod, a first guiding belt drive pulley, a first guiding belt slave pulley, and a first guiding belt; the first guiding belt may go around the first guiding belt drive pulley and the first guiding belt slave pulley; the first guiding fixture may be provided with a first through-hole, a second through-hole, a first guiding through-hole, and a brush rotation motor; the first guiding belt may pass through the first through-hole and may be fixed inside the first through-hole; the first guiding belt may slide freely in the second through-hole; the first guiding rod may pass through the first guiding through-hole; the brush rotation motor may rotate one end of the rotary brush; the first brush motor may drive the first guiding belt drive pulley.

The second guiding member further may have a second guiding rod, a second guiding fixture slides along the second guiding rod, a second guiding belt drive pulley, a second guiding belt slave pulley, and a second guiding belt; the second guiding belt may go around the second guiding belt drive pulley and the second guiding belt slave pulley; the second guiding fixture may be provided with a third through-hole, a fourth through-hole, a second guiding through-hole, and a brush bearing; the second guiding belt may pass through the third through-hole and may be fixed inside the third through-hole; the second guiding belt may slide freely in the fourth through-hole; the second guiding rod may pass through the second guiding through-hole; the brush bearing may support another end of the rotary brush; a second brush motor synchronized with the first brush motor may drive the second guiding belt drive pulley.

The cross-section of the first through-hole, the second through-hole, the third through-hole, and the fourth through-hole may be rectangular.

These, as well as other components, steps, features, objects, benefits, and advantages, will now become clear from a review of the following detailed description of illustrative embodiments, the accompanying drawings, and the claims.

Other systems, devices, methods, features, and advantages will be or become apparent to one with skill in the art upon examination of the following drawings and detailed descriptions. It is intended that all such additional systems, methods, features, and advantages be included within this description, be within the scope of the present disclosure, and be protected by the accompanying claims and drawings.

BRIEF DESCRIPTION OF THE DRAWINGS

The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

The same reference numerals refer to the same parts throughout the various views of the drawings.

DETAILED DESCRIPTION OF ILLUSTRATIVE EMBODIMENTS

Figure 1A:
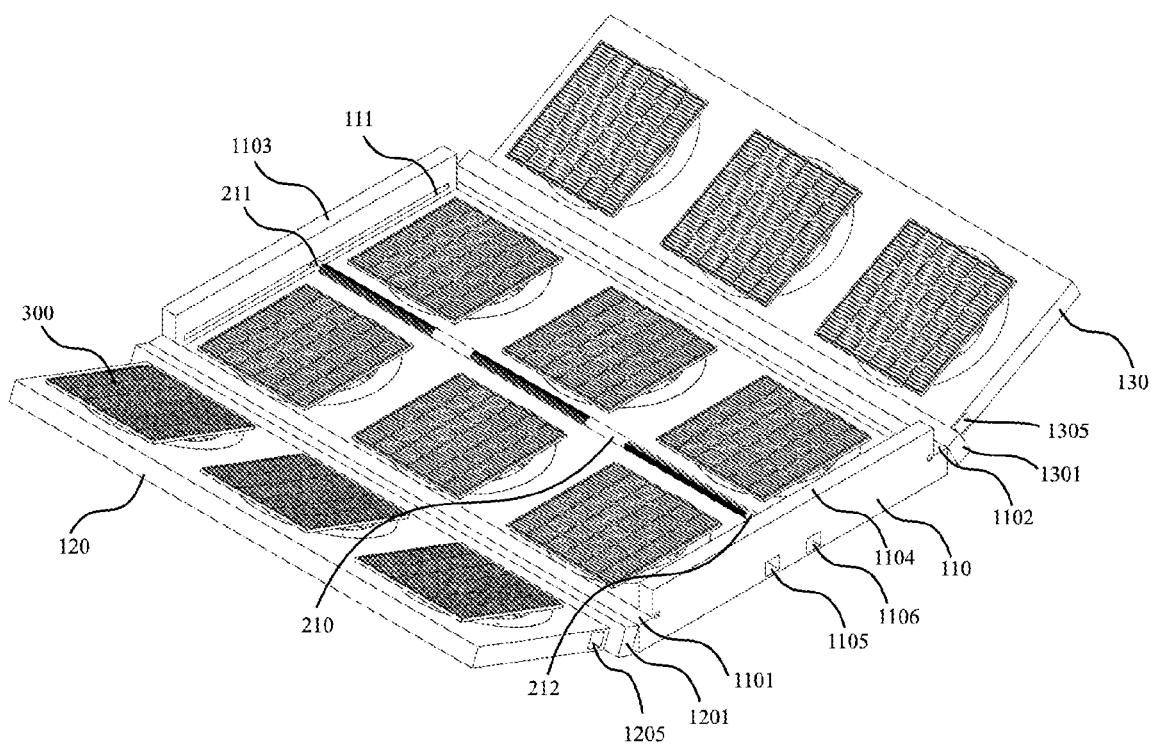
FIG. 1A illustrates the self-cleaning foldable solar panel system in folding/unfolding status.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in the drawings. Furthermore, there is no intention to be bound by any expressed or implied theory presented in the preceding technical field, background, summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1B:
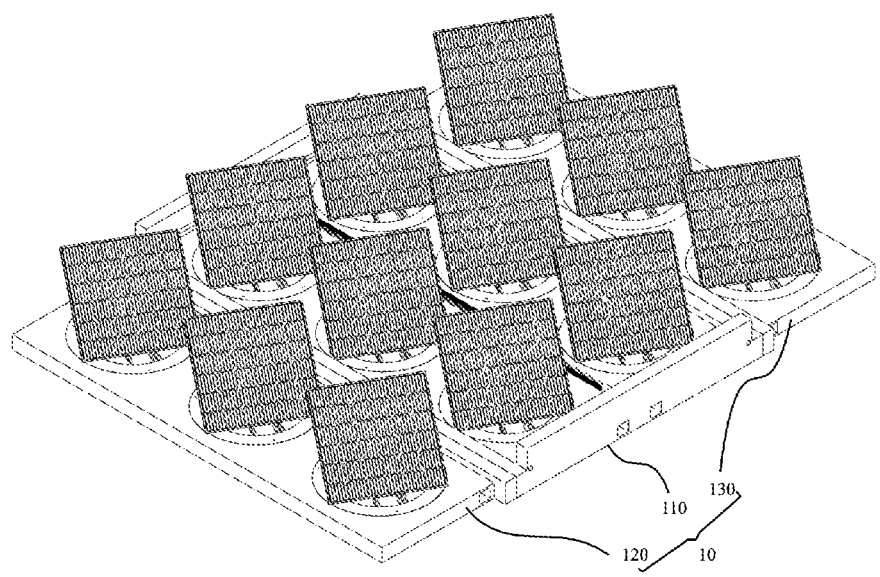
FIG. 1B illustrates the self-cleaning foldable solar panel system in unfolded status.
Figure 1C:
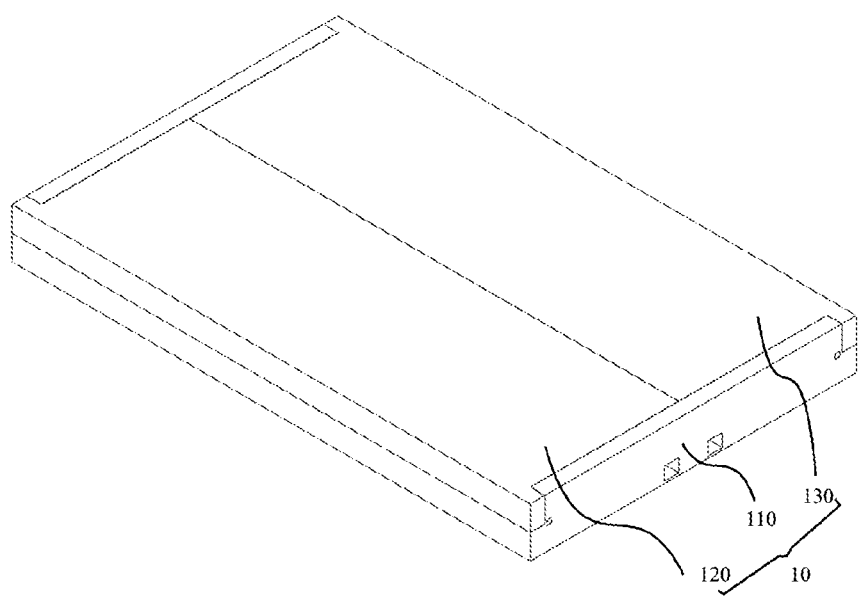
FIG. 1C illustrates the self-cleaning foldable solar panel system in folded status.

FIGS. 1A-1C shows schematic views of different statuses of the self-cleaning foldable solar panel system. The framework of this box-like structure is made of lightweight metal materials to reduce the total weight put on the roof.

As a preferred embodiment, a total of 12 solar panel units are assembled in the form of 3×4 and can be tailored based on the power consumption of users. The folding and unfolding can be realized through external linkage/hydraulic systems attached to both ends of the framework.

A self-cleaning foldable solar panel system is provided. The self-cleaning foldable solar panel system has a foldable support system 10 and a self-cleaning unit 20.

FIG. 1A illustrates the self-cleaning foldable solar panel system in folding/unfolding status.

The foldable support system 10 has a main support board 110, a first support board 120, and a second support board 130; a first edge 1101 of the main support board 110 is pivoted to an edge 1201 of the first support board 120; a second edge 1102 of the main support board 110 is pivoted to an edge 1301 of the second support board 130; a third edge 1103 of the main support board 110 is provided with a first guiding member 111; a fourth edge 1104 of the main support board 110 is provided with a second guiding member 112.

FIG. 1B illustrates the self-cleaning foldable solar panel system in unfolded status.

The unfolded state is also the working state of the solar panel. An array of solar panels 300 is integrated into this foldable solar panel system 10, and these solar panels 300 are capable of 360-degree positioning and 0~45-degree angling to collect most of the solar radiation in certain locations. The positions and angles of these solar panels can be controlled both simultaneously and separately, and the modular design can facilitate the replacement and maintenance of components.

In the unfolded state, the upper surfaces of the main support board 110, the first support board 120, and the second support board 130 lie approximately in the same plane.

The main support board 110, the first support board 120, and the second support board 130 are each independently installed with multiple solar panels 300.

The self-cleaning unit 20 has at least a rotary brush 210 and a first brush motor 220; one end 211 of the rotary brush 210 is set on the first guiding member 111, another end 212 of the rotary brush 210 is set on the second guiding member 112, the first brush motor 220 drives the rotary brush 210 to move along the first guiding member 111 and the second guiding member 112. In this means, the first brush motor makes the rotary brush be able to realize forward and backward motions.

FIG. 1C illustrates the self-cleaning foldable solar panel system in folded status.

In the folded state, the upper surfaces of the first support board 120 and the second support board 130 are approximately opposite to the upper surface of the main support board 110.

The self-cleaning unit 20 having a washing brush is located in the middle of the framework in default and it is only activated during folded status so as to wash both panel arrays on top and bottom together.

Figure 7A:
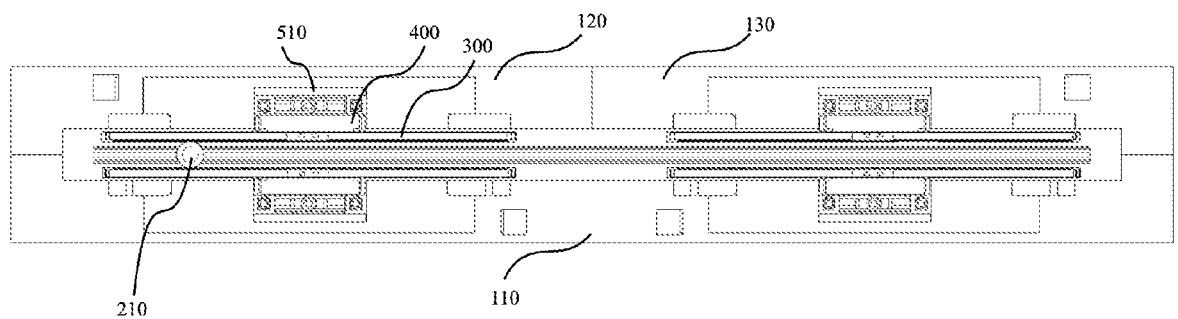
FIG. 7A shows the cross-sectional view of the self-washing status of the folded solar panel system.
Figure 7B:
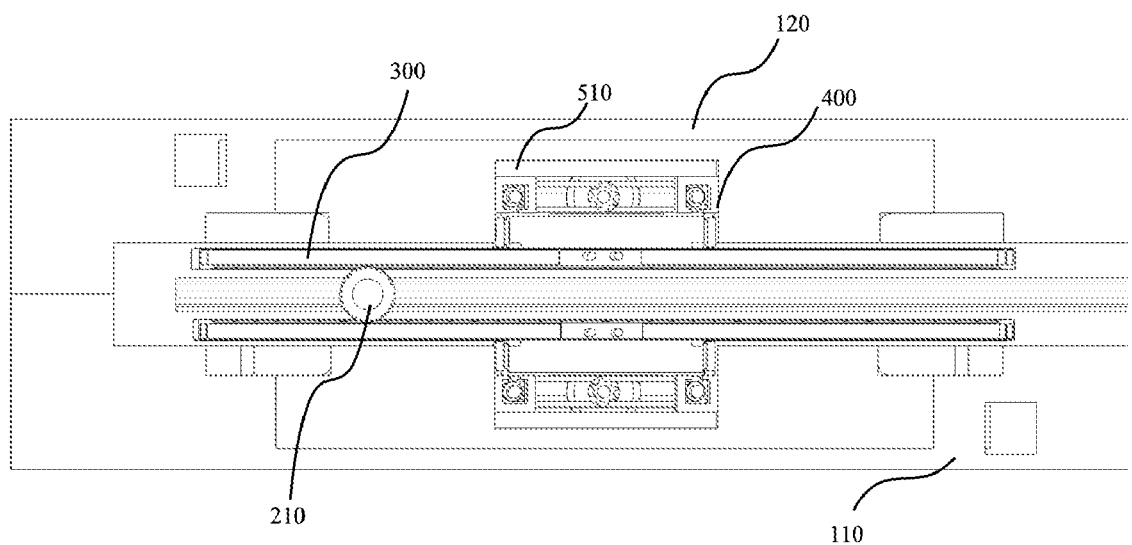
FIG. 7B is an enlarged cross-sectional view of the self-washing status of the left half of the folded solar panel system.

The cross-sectional view of FIG. 1C is also illustrated in FIG. 7A and FIG. 7B.

Figure 2A:
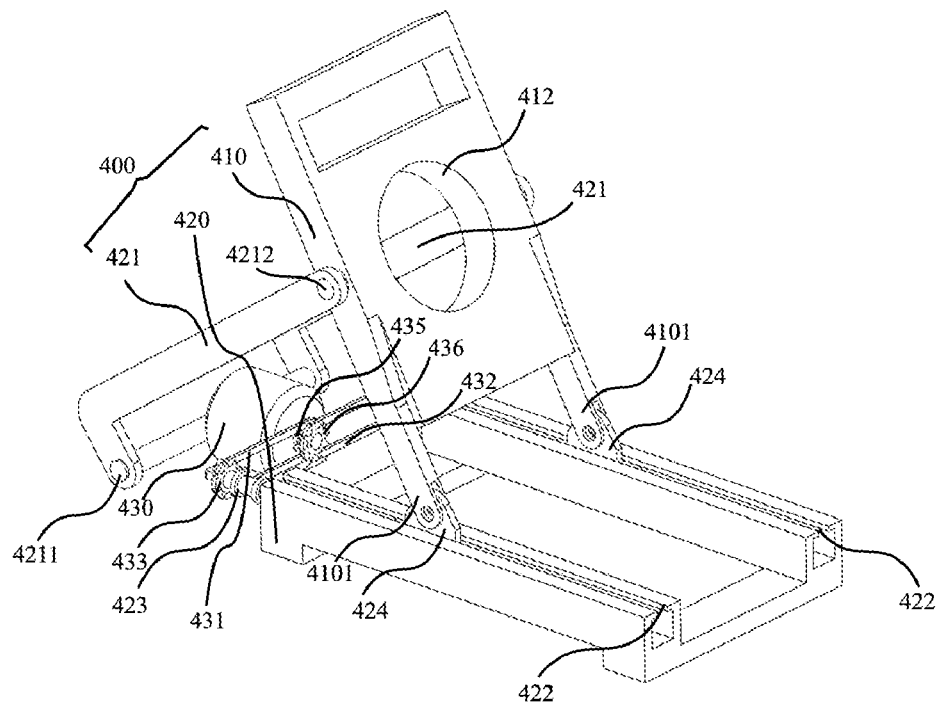
FIG. 2A illustrates a schematic view of the support frame.
Figure 2B:
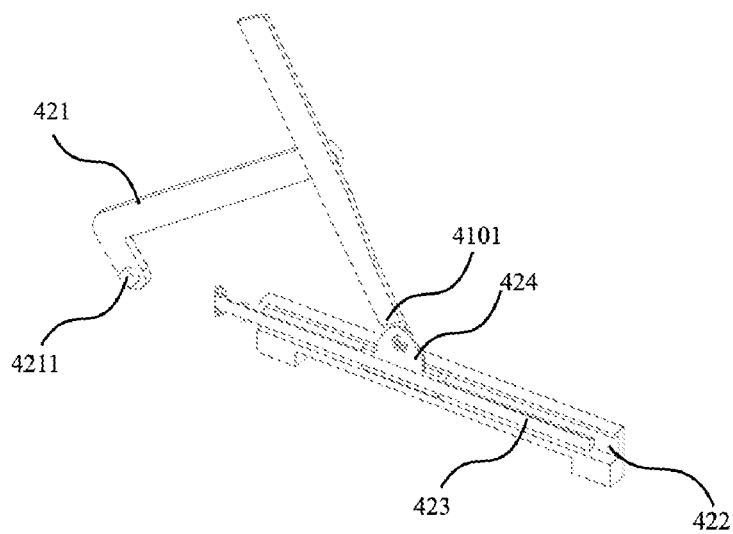
FIG. 2B illustrates the cross-sectional view of the screw in the slide of the support frame.

FIG. 2A illustrates a schematic view of the support frame.
FIG. 2B illustrates the cross-sectional view of the screw in the slide of the support frame. Angle modification of the solar panel is achieved via the tilted support frame using screws.

Each solar panel 300 is mounted on the support frame 400; the support frame 400 has a solar panel mounting bracket 410, a support base 420, and a solar panel drive motor 430; the solar panel 300 is mounted on the solar panel mounting bracket 410, one end 4101 of the solar panel mounting bracket 410 is hinged to the support base 420; solar panel drive motor 430 drives the solar panel mounting bracket 410 to rotate relative to the support base 420.

In another embodiment, a central hole 412 is provided for installing the solar panel 300.

In another embodiment, the solar panel drive motor 430 is a stepper motor.

Each support base 420 has a pair of support rods 421, a pair of slides 422, a pair of screws 423, and a pair of sliders 424. The pair of screws 423 drives the pair of sliders 424 to move forward and backward along the pair of slides 422; one pair of ends 4211 of the support rods 421 is pivoted to the support base 420, another pair of ends 4212 of the support rods 421 is pivoted to middle of the solar panel mounting bracket 410; one end 4101 of the solar panel mounting bracket 410 is hinged to the pair of sliders 424.

Each support frame 400 has a first screw belt 431, a second screw belt 432, a first screw pulley 433, a second screw pulley 434, a first drive pulley 435, and a second drive pulley 436 coaxial to the shaft of the solar panel drive motor 430. The solar panel drive motor 430 drives the first drive pulley 435 and the second drive pulley 436 synchronously. The first drive pulley 435 drives the first screw belt 431 to move, thereby driving the first screw pulley 433 that cooperates with the first screw belt 431 to rotate. The second drive pulley 436 drives the second screw belt 432 to move, thereby driving the second screw pulley 434 which cooperates with the second screw belt 432 to rotate. The first screw pulley 433 and the second screw pulley 434 drive the pair of screws 423 to rotate.

The modular design can facilitate the replacement and maintenance of driving units.

In addition to the tilt angle adjustment of the solar panel, another embodiment also provides horizontal adjustment. In detail, the rotation of each column of solar panels is realized by the rotation of worm gear systems embedded in the support boards.

Figure 3:
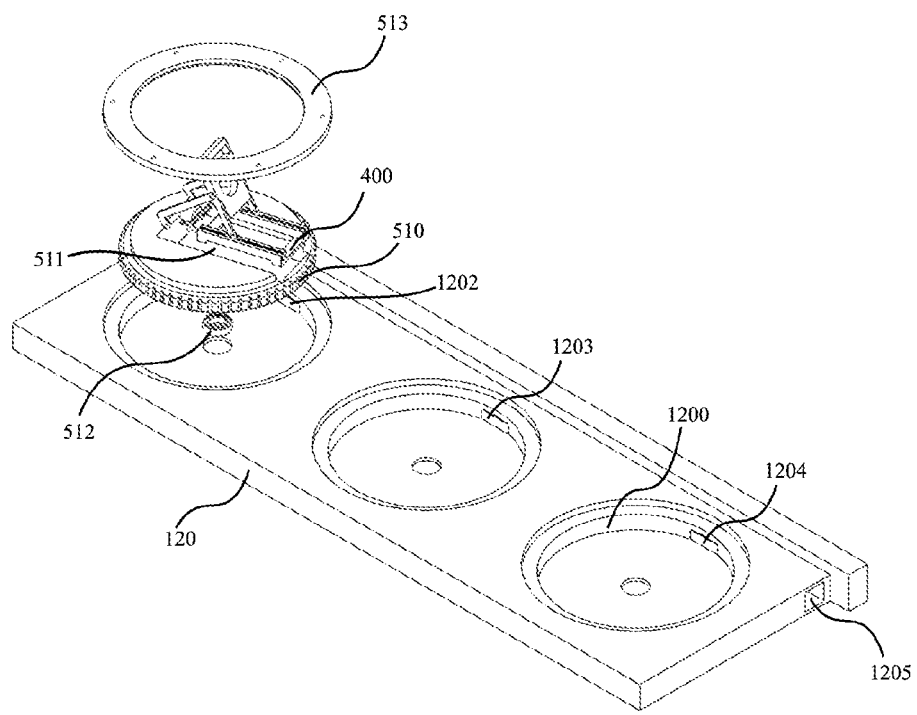
FIG. 3 illustrates the detailed structure of the support frame on a worm wheel.

FIG. 3 illustrates the detailed structure of the support frame on a worm wheel and the worm gear system for rotating the column (i.e., 1×3 array) of solar panels. The worm gear system consists of a worm 520 and three worm wheels 510 (shown in FIG. 4) which are utilized to host the support frame 400.

Each support frame 400 is mounted on a worm wheel 510; each worm wheel 510 is rotatably mounted on the main support board 110, the first support board 120, or the second support board 130. Worm wheels 510 are arranged in columns or array.

Each worm wheel 510 is provided with a notch 511 on the top surface to embed the support frame 400.

In another embodiment, each worm wheel 510 is mounted on a deep groove ball bearing 512.

In another embodiment, a fixing ring 513 is applied to hold each worm wheel 510 inside the cavity 1200 in folding and unfolding status.

The main support board 110 is provided with at least one column of worm wheel accommodating cavities 1200; the main support board 110 is provided with at least one worm channel 1105, 1106, 1205, 1305; a worm window is provided on walls of each worm wheel accommodating cavity 1200 on the same column along the same worm channel. Worm wheels 510 on the same column are driven by the same worm.

The first support board 120 is provided with at least one column of worm wheel accommodating cavities 1200; the first support board 120 is provided with at least one worm channel; a worm window for a worm to engage with the worm wheel is provided on the inner wall of each worm wheel accommodating cavity 1200 on a same column along the same worm channel 1205. In FIG. 3, worm windows 1202, 1203, and 1204 are provided for the worm in the worm channel 1205 to rotate the worm wheels 510 on the first support board 120.

The second support board 130 is provided with at least one column of worm wheel accommodating cavities 1200; the second support board 130 is provided with at least one worm channel 1305; a worm window for a worm to engage with the worm wheel is provided on the inner wall of each worm wheel accommodating cavity 1200 on the same column along the same worm channel 1305.

The worms of different columns are controlled by the same worm controller synchronously.

When rotational power is applied to the worm through stepper motors attached to one of its terminals, it transfers power to the worm wheels, making them self-rotating simultaneously. The system is designed so that the worm easily turns the worm wheels, but the worm wheels cannot turn the worm (self-locking for safety during device transmission). In addition, worm gears are the most compact type of system and provide high-ratio speed reduction. They are often the preferred type of gearing system when space is limited, and large gear reductions are needed. They are also the smoothest and quietest of gear systems.

Figure 4:
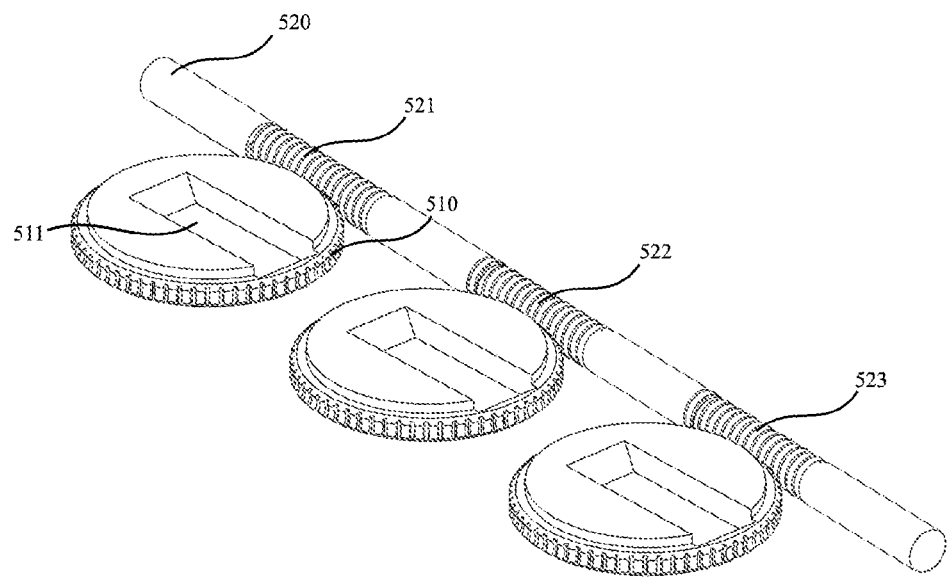
FIG. 4 illustrates a worm gear system for rotating the 1×3 column of solar panels.

FIG. 4 illustrates a worm gear system for rotating the 1×3 array of solar panels.

As shown in FIG. 4, the worm inside the worm channel 1205 is a segmental worm with threads 521, 522, and 523 corresponding only to worm windows 1202, 1203, and 1204 accordingly.

In another embodiment shown in FIG. 1A, there are in total four worm gear systems to rotate all the solar panels 300 of the 4×3 array. The worms are accommodated in worm channels 1105, 1106, 1205, and 1305 respectively. The worms can be controlled separately or synchronously to rotate.

Figure 5:
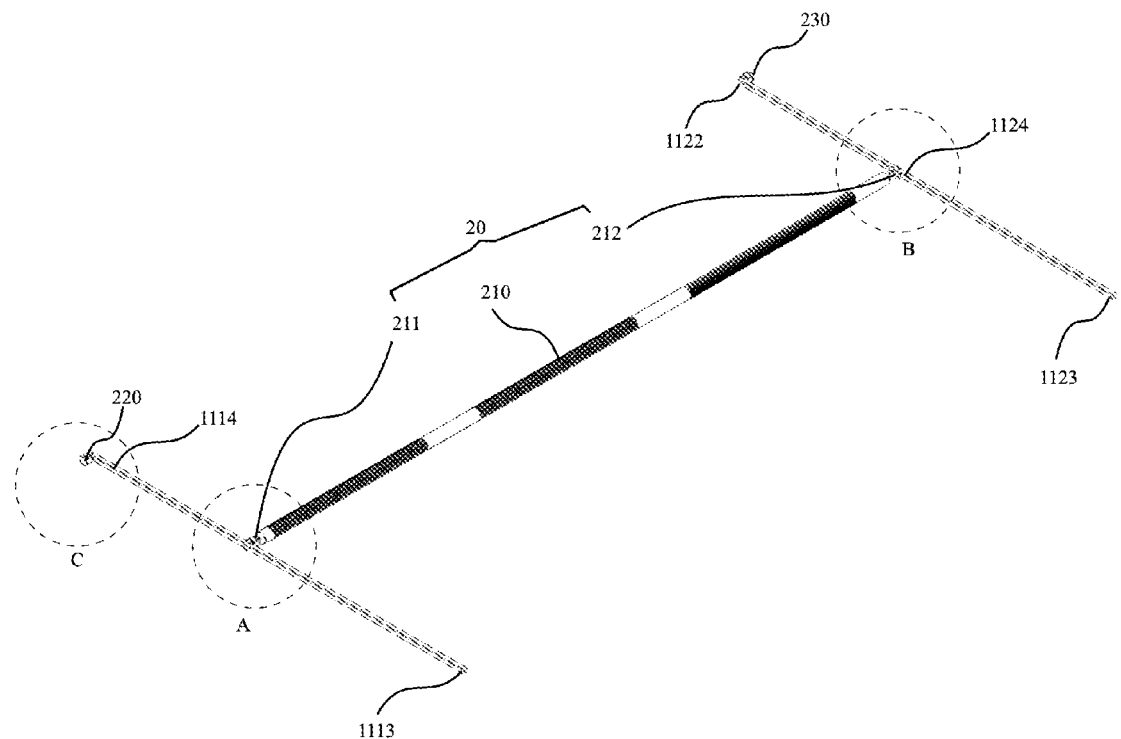
FIG. 5 illustrates a locomotion system for the rotary brush.

FIG. 5 illustrates a locomotion system for the rotary brush. One end of the rotary brush 210 is connected to a motor to realize self-spin, while the other end of it is put into a bearing stand for free rotation. Two fixtures, each, are designed with one hole for hosting a bearing so as to realize smooth sliding along the long metal guiding rods.

The first guiding member 111 further has a first guiding rod 1115, a first guiding fixture 1111 slides along the first guiding rod, a first guiding belt 1114 drive pulley 1112, a first guiding belt slave pulley 1113, and a first guiding belt 1114, the first guiding belt 1114 goes around the first guiding belt drive pulley 1112 and the first guiding belt slave pulley 1113. The first brush motor 220 drives the first guiding belt drive pulley 1112.

The second guiding member 112 further has a second guiding rod 1125, a second guiding fixture 1121 slides along the second guiding rod 1125, a second guiding belt drive pulley 1122, a second guiding belt slave pulley 1123, and a second guiding belt 1124, the second guiding belt 1124 goes around the second guiding belt drive pulley 1122 and the second guiding belt slave pulley 1123. The second brush motor 230 synchronized with the first brush motor 220 drives the second guiding belt drive pulley 1122.

Figure 6A:
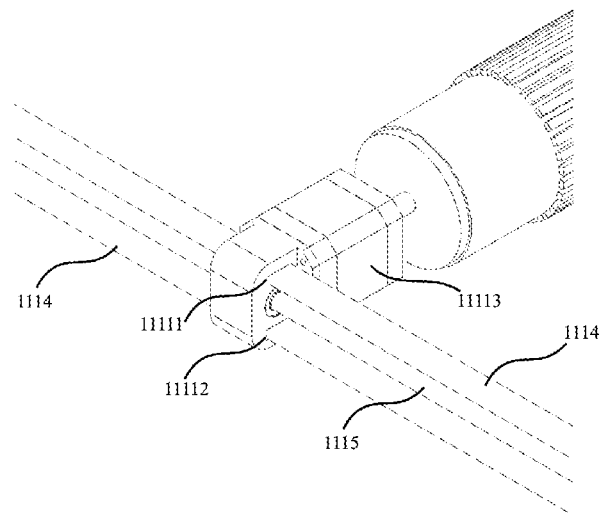
FIG. 6A illustrates an enlarged schematic view of the first guiding fixture in FIG. 5.

FIG. 6A illustrates an enlarged schematic view of the first guiding fixture in FIG. 5.

Figure 6B:
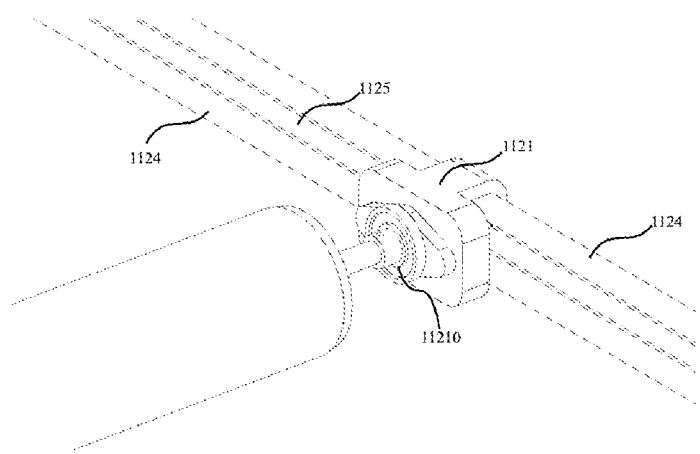
FIG. 6B illustrates an enlarged schematic view of the second guiding fixture in FIG. 5.
Figure 6C:
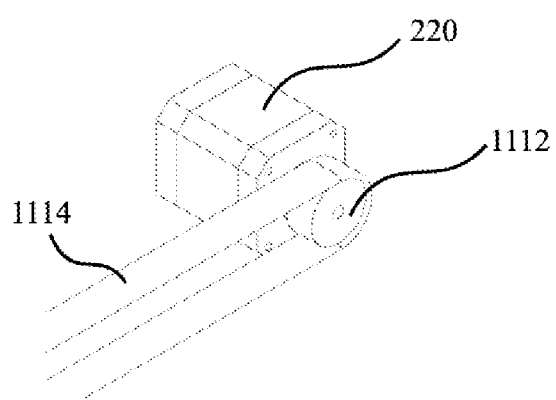
FIG. 6C illustrates an enlarged schematic view of the first brush motor in FIG. 5.
Figure 6D:
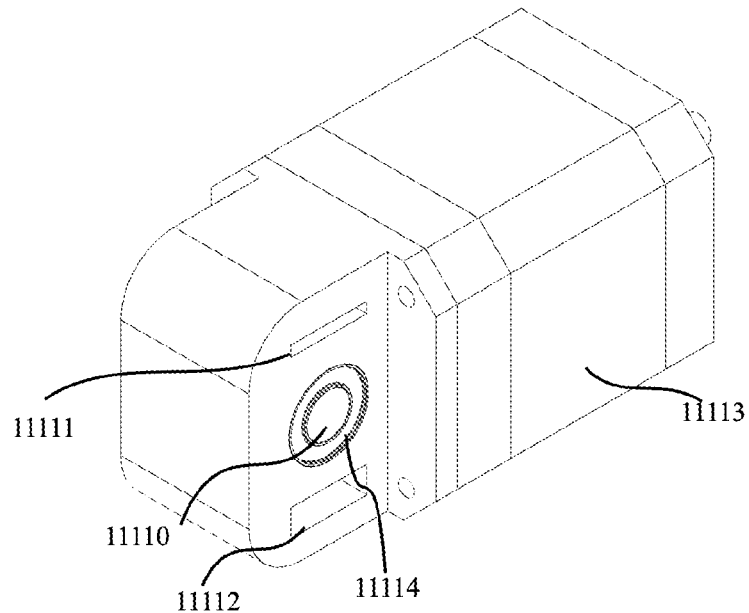
FIG. 6D illustrates another enlarged schematic view of the first guiding fixture in FIG. 6A.

FIG. 6D illustrates another enlarged schematic view of the first guiding fixture in FIG. 6A.

The first guiding fixture 1111 is provided with a first through-hole 11111, a second through-hole 11112, a first guiding through-hole 11110, and a brush rotation motor 11113; the first guiding belt 1114 passes through the first through-hole 11111 and is fixed inside the first through-hole 11111; the first guiding belt 1114 slides freely in the second through-hole 11112; the first guiding rod passes through the first guiding through-hole 11110; the brush rotation motor 11113 rotates one end 211 of the rotary brush 210.

In another embodiment, the brush rotation motor 11113 is a stepper motor. In this means, the brush is able to be self-rotated for better clean quality.

FIG. 6B illustrates an enlarged schematic view of the second guiding fixture in FIG. 5.

Figure 6E:
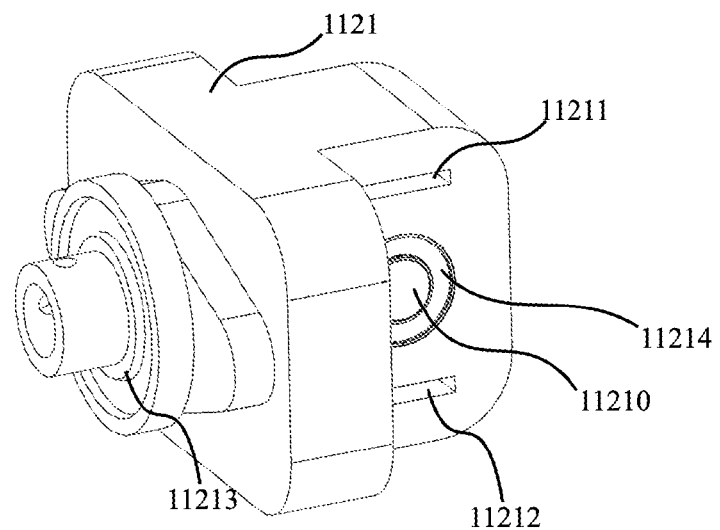
FIG. 6E illustrates another enlarged schematic view of the second guiding fixture in FIG. 6B.

FIG. 6E illustrates another enlarged schematic view of the second guiding fixture in FIG. 6B.

The second guiding fixture 1121 is provided with a third through-hole 11211, a fourth through-hole 11212, a second guiding through-hole 11210, and a brush bearing 11213. The third through-hole 11211, the fourth through-hole 11212, and the second guiding through-hole 11210 are set up in the same way as the first through-hole 11111, the second through-hole 11112, the first guiding through-hole 11110 respectively. The second guiding belt 1124 passes through the third through-hole 11211 and is fixed inside the third through-hole 11211; the second guiding belt 1124 slides freely in the fourth through-hole 11212; the second guiding rod 1125 passes through the second guiding through-hole 11210; the brush bearing 11213 supports another end 212 of the rotary brush 210.

The cross-section of the first through-hole 11111, the second through-hole 11112, the third through-hole 11211, and the fourth through-hole 11212 is rectangular in order to match the cross-section of the guiding belts.

FIG. 6C illustrates an enlarged schematic view of the first brush motor in FIG. 5.

The first brush motor 220 drives the first guiding belt drive pulley 1112.

The combination of the first brush motor 220 and the second brush motor 230 drive makes the reciprocating motion of the rotary brush 210 smoother and more stable.

In another embodiment, the first brush motor 220 and the second brush motor 230 are both stepper motors.

A first guiding bearing 11114 is mounted inside the first guiding through-hole 11110 and a second guiding bearing 11214 is mounted inside the second guiding through-hole.

The rotary brush 210 is provided with a hollow shaft, the hollow shaft is provided with at least one cleaning fluid nozzle (not shown), and at least one vacuum suction port (not shown).

The cleaning fluid nozzle is connected to a cleaning fluid tank through a fluid line; the vacuum suction port is connected to a vacuum pump through an air line.

Two columns of solar panels are installed on the main support board 110; one column of solar panels 300 is installed on the first support board 120; one column of solar panels 300 is installed on the second support board 130; each column of solar panels 300 has at least three solar panels 300.

FIG. 7A shows the self-washing status of the folded solar panel system.

FIG. 7B is an enlarged view of the self-washing status of the left half of the folded solar panel system.

In such a configuration, the back-and-forth rotation of the rotary brush 210 enables solar panels 300 both on top and bottom of the rotary brush 210 to be thoroughly cleaned.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

Except as otherwise stated immediately above, nothing that has been stated or illustrated is intended or should be interpreted to cause a dedication of any component, step, feature, object, benefit, advantage, or equivalent to the public, regardless of whether it is recited in the claims.

The terms and expressions used herein have the ordinary meaning accorded to such terms and expressions in their respective areas, except where specific meanings have been set forth. Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

What is claimed is:

1. A self-cleaning foldable solar panel system, comprising a foldable support system and a self-cleaning unit; wherein, the foldable support system comprises: a main support board, a first support board, and a second support board; a first edge of the main support board is pivoted to an edge of the first support board; a second edge of the main support board is pivoted to an edge of the second support board; a third edge of the main support board is provided with a first guiding member; a fourth edge of the main support board is provided with a second guiding member; the self-cleaning unit comprises at least a rotary brush and a first brush motor; one end of the rotary brush is set on the first guiding member, another end of the rotary brush is set on the second guiding member, the first brush motor drives the rotary brush to move along the first guiding member and the second guiding member, wherein the rotary brush is located in middle of a framework in default and the rotary brush is only activated during a folded status to wash both panel arrays on top and bottom together; the main support board, the first support board, and the second support board are each independently installed with multiple solar panels.

2. The self-cleaning foldable solar panel system of claim 1, wherein each solar panel is mounted on a support frame; the support frame comprises a solar panel mounting bracket, a support base, and a solar panel drive motor; the solar panel is mounted on the solar panel mounting bracket, one end of the solar panel mounting bracket is hinged to the support base; the solar panel drive motor drives the solar panel mounting bracket to rotate relative to the support base.

3. The self-cleaning foldable solar panel system of claim 2, wherein each support frame is mounted on a worm wheel; each worm wheel is rotatably mounted on the main support board, the first support board, or the second support board; worm wheels are arranged in columns.

4. The self-cleaning foldable solar panel system of claim 3, wherein worm wheels on a same column are driven by a worm.

5. The self-cleaning foldable solar panel system of claim 3, wherein the main support board is provided with at least one column of worm wheel accommodating cavities; the main support board is provided with at least one worm channel; a worm window for a worm to engage with the worm wheels is provided on inner wall of each worm wheel accommodating cavity along the at least one worm channel.

6. The self-cleaning foldable solar panel system of claim 3, wherein the first support board is provided with at least one column of worm wheel accommodating cavities; the first support board is provided with at least one worm channel; a worm window for a worm to engage with the worm wheels is provided on inner wall of each worm wheel accommodating cavity along the at least one worm channel.

7. The self-cleaning foldable solar panel system of claim 6, wherein worm inside the worm channel is a segmental worm with threads corresponding to the worm window.

8. The self-cleaning foldable solar panel system of claim 3, wherein the second support board is provided with at least one column of worm wheel accommodating cavities; the second support board is provided with at least one worm channel; a worm window for a worm to engage with the worm wheels is provided on inner wall of each worm wheel accommodating cavity along the at least one worm channel.

9. The self-cleaning foldable solar panel system of claim 4, wherein worms are controlled by worm controller synchronously.

10. The self-cleaning foldable solar panel system of claim 3, wherein each worm wheel is provided with a notch on top surface to embed the support frame.

11. The self-cleaning foldable solar panel system of claim 3, wherein each worm wheel is mounted on a deep groove ball bearing.

12. The self-cleaning foldable solar panel system of claim 2, wherein each support base comprises a pair of support rods, a pair of slides, a pair of screws, and a pair of sliders; the pair of screws drives the pair of sliders to move forward and backward along the pair of slides; one rod end of each support of the pair of support rods is pivoted to the support base, another end of each support rod of the pair of support rods is pivoted to middle of the solar panel mounting bracket; one end of the solar panel mounting bracket is hinged to the pair of sliders.

13. The self-cleaning foldable solar panel system of claim 12, wherein each support frame comprises a first screw belt, a second screw belt, a first screw pulley, a second screw pulley, and a first drive pulley and a second drive pulley coaxial to shaft of the solar panel drive motor; the solar panel drive motor drives the first drive pulley and the second drive pulley synchronously; the first drive pulley drives the first screw belt to move, thereby driving the first screw pulley that cooperates with the first screw belt to rotate; the second drive pulley drives the second screw belt to move, thereby driving the second screw pulley that cooperates with the second screw belt to rotate; the first screw pulley and the second screw pulley drive the pair of screws to rotate.

14. The self-cleaning foldable solar panel system of claim 1, wherein the first guiding member further comprises a first guiding rod, a first guiding fixture slides along the first guiding rod, a first guiding belt drive pulley, a first guiding belt slave pulley, and a first guiding belt; the first guiding belt goes around the first guiding belt drive pulley and the first guiding belt slave pulley; wherein, the first guiding fixture is provided with a first through-hole, a second through-hole, a first guiding through-hole, and a brush rotation motor; the first guiding belt passes through the first through-hole and is fixed inside the first through-hole; the first guiding belt slides freely in the second through-hole; the first guiding rod passes through the first guiding through-hole; the brush rotation motor rotates one end of the rotary brush; the first brush motor drives the first guiding belt drive pulley.

15. The self-cleaning foldable solar panel system of claim 14, wherein the second guiding member further comprises a second guiding rod, a second guiding fixture slides along the second guiding rod, a second guiding belt drive pulley, a second guiding belt slave pulley, and a second guiding belt; the second guiding belt goes around the second guiding belt drive pulley and the second guiding belt slave pulley; wherein, the second guiding fixture is provided with a third through-hole, a fourth through-hole, a second guiding through-hole, and a brush bearing; the second guiding belt passes through the third through-hole and is fixed inside the third through-hole; the second guiding belt slides freely in the fourth through-hole; the second guiding rod passes through the second guiding through-hole; the brush bearing supports another end of the rotary brush; a second brush motor synchronized with the first brush motor drives the second guiding belt drive pulley.

16. The self-cleaning foldable solar panel system of claim 15, wherein cross-section of the first through-hole, the second through-hole, the third through-hole, and the fourth through-hole is rectangular.

* * * * *